G. J. PEPIN.
WHIFFLETREE ATTACHMENT.
APPLICATION FILED OCT. 20, 1910.
1,020,442.
Patented Mar. 19, 1912.
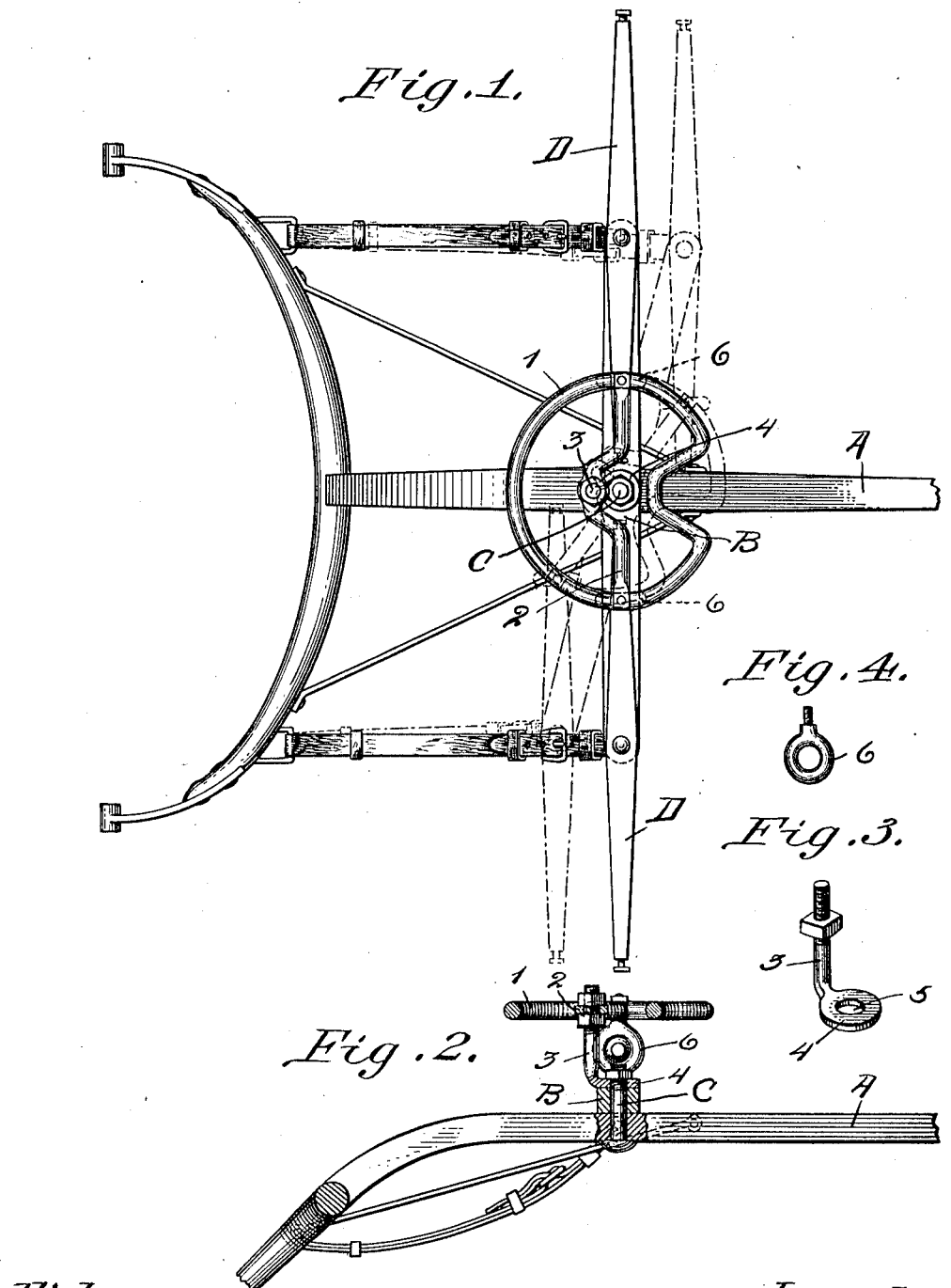

UNITED STATES PATENT OFFICE.

GEORGE J. PEPIN, OF BOTTINEAU, NORTH DAKOTA.

WHIFFLETREE ATTACHMENT.

1,020,442.      Specification of Letters Patent.      Patented Mar. 19, 1912.

Application filed October 20, 1910. Serial No. 588,120.

*To all whom it may concern:*

Be it known that I, GEORGE J. PEPIN, a citizen of the United States, residing at Bottineau, in the county of Bottineau and State of North Dakota, have invented certain new and useful Improvements in Whiffletree Attachments, of which the following is a specification.

My invention relates to devices for attachment to the whiffletrees of two horse eveners for vehicles and has for its object the provision of a device that is adapted to be secured to the pivot pin of the evener or double tree and to the inner ends of the whiffletrees, and that serves as a guard to prevent the driving lines from getting caught under the inner ends of the whiffletrees, also to act as a brace to prevent the inner end from breaking, also that serves to maintain the whiffletrees in perpendicular relationship to the draft pole; and that prevents the trace from being unhooked from the inner end of the whiffletree should the outer end be broken.

My invention will be described in detail hereinafter and illustrated in the accompanying drawings in which—

Figure 1 is a plan view of the draft apparatus of a two horse vehicle showing my attachment in position, Fig. 2, a vertical sectional view of the draft apparatus and my attachment, Fig. 3, a detail of the pivot pin for my attachment, and Fig. 4, a detail of one of the swivel rings.

In the drawings similar reference characters will be used to designate corresponding parts in the several views.

A indicates the draft pole having the evener or double-tree B pivotally secured thereto by means of pin C, and D the whiffletrees pivotally secured to the ends of the double-tree B.

My invention comprises the substantially circular frame 1 having the cross-bar 2 secured thereto and secured to an upright stud post 3 having a circular foot 4 with an opening 5 to receive pin C and on which the foot 4 rotates.

6 indicates circular loops that are swivelly mounted on opposite sides of frame 1 and adapted to receive the inner ends of the whiffletrees D.

As shown in Fig. 1 the frame 1 when in position forms a guard for the inner ends of whiffletrees D so that the driving lines cannot get under them, nor can the lines get under the frame because of the circular loops 6 that effectually prevent it. Furthermore it will be apparent that the frame 1 and loops 6 form substantial braces for the inner ends of the whiffletrees D and prevent said inner ends from breaking as well as also preventing the inner ends swinging around toward the front, should the outer end of the whiffletree be broken, thus preventing the trace on the inner end of the whiffletree from coming off.

Having thus described my invention what I claim is—

1. In combination with a draft appliance comprising a double-tree and whiffletrees pivotally secured to its ends, a circular frame, a cross-bar secured to said frame, means to pivotally secure the cross-bar to the double-tree, and means mounted on said frame to engage the inner ends of the whiffletrees.

2. In combination with a draft appliance comprising a double-tree pivotally mounted on a suitable pin, and whiffletrees pivotally secured to the ends of the double trees, a stud post pivotally secured to the double-tree pin, a frame secured to said stud post, and circular loops swivelly secured to said frame and engaging the inner ends of the whiffletrees.

GEORGE J. PEPIN.

Witnesses:
E. H. CHAMHOLM,
FRANK SCULLY.

Copies of this patent may be obtained for five cents each, by addressing the "Commissioner of Patents, Washington, D. C."